S. R. PARKES.
MEANS FOR ADJUSTING BALL BEARINGS.
APPLICATION FILED MAR. 8, 1913.
1,165,537.
Patented Dec. 28, 1915.
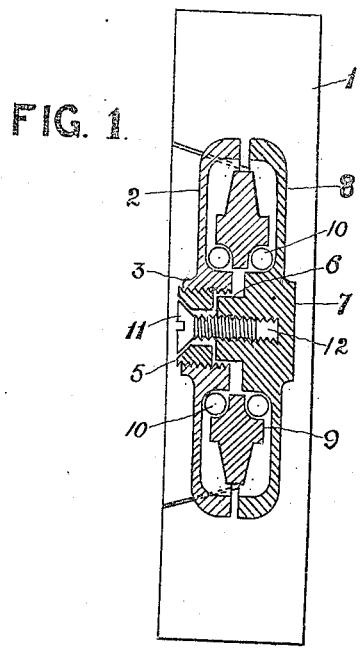
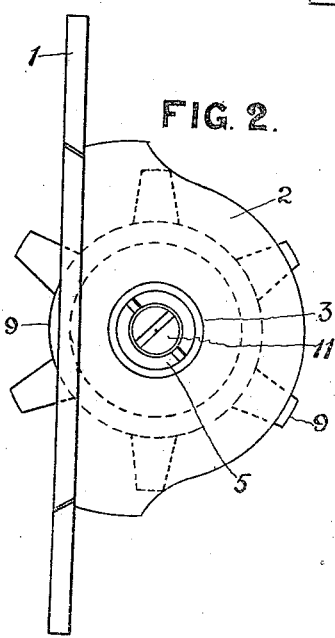
WITNESSES:
John C. Sanders
Albert F. Heuman
INVENTOR:
Samuel Rowland Parkes
BY Wallace White
ATTY.

UNITED STATES PATENT OFFICE.

SAMUEL ROWLAND PARKES, OF WILLENHALL, ENGLAND.

MEANS FOR ADJUSTING BALL-BEARINGS.

1,165,537. Specification of Letters Patent. Patented Dec. 28, 1915.

Application filed March 8, 1913. Serial No. 752,938.

*To all whom it may concern:*

Be it known that I, SAMUEL ROWLAND PARKES, a subject of the King of Great Britain, residing at Pretoria Works, Willenhall, in the county of Stafford, England, have invented new and useful Improvements in Means for Adjusting Ball-Bearings, of which the following is a specification.

This invention has reference to means for adjusting ball bearings, and is particularly applicable to sash pulleys although it may be used for other bearings where adaptable.

The object of the invention is to enable such bearings to be readily adjusted in a simple and inexpensive manner.

The invention is illustrated on the accompanying drawings in which:—

Figure 1 is a part sectional back view showing the method of adjustment as applied to a sash pulley bearing. Fig. 2 is a side view of Fig. 1. Fig. 3 is a view of the hollow adjusting screw. Fig. 4 is a sectional view of Fig. 3.

In applying the adjustment to a sash pulley of the kind in which a portion of the face plate 1, formed with or attached to the part or cheek 2, is connected by a dovetail joint to the other part of said face plate, I form a tapped hole in the boss 3 of the said cheek 2 and in this tapped hole I fit a hollow adjusting screw 5. This hollow adjusting screw 5 bears against the reduced portion 6 of the boss 7 on the other part or cheek 8, which reduced portion projects into the tapped hole of the boss 3 in which the said hollow screw fits. The pulley wheel 9, whether plain or provided with sprocket teeth on its periphery, fits around the internal portions of the bosses 3 and 7 and between the two parts 2 and 8 of the case or frame, the balls 10 being located on either side of said pulley wheel 9. A screw pin 11 passes through the hollow adjusting screw 5 and screws into a tapped hole 12 in the boss 7 of the half or part 8 of the frame or case, for holding the said hollow screw and parts 2 and 8 together.

When the bearing requires to be adjusted, that is—any wear or slackness taken up, the screw pin 11 is removed and the hollow screw 5 slightly unscrewed, thus allowing the parts 2 and 8 to close together and be accurately adjusted. The screw pin 11 is then replaced and the parts thus locked together again. It will be evident this method of adjusting ball bearings may be adapted to various kinds of bearings other than sash pulleys.

What I claim as my invention and desire to secure by Letters Patent is:—

1. In an adjusting device for ball bearings, in combination, a portion provided with a boss having an internally threaded hole, a second portion provided with a boss having a projection with a smooth periphery, said projection extending loosely within said hole, an adjusting screw having threaded engagement with the threads of said hole and adapted to engage the end of said projection to vary the play between said parts, a member rotatably mounted on said bosses, balls positioned between said member and said bosses, and means for holding said portions in their adjusted positions whereby to draw the same together or permit separation thereof.

2. In an adjusting device for ball bearings, in combination, a portion provided with a boss having an internally threaded hole, a second portion provided with a boss having a projection extending within said hole, said second mentioned boss being provided with a threaded recess, a hollow adjusting screw within said threaded hole and adapted to be moved toward or away from the end of said projection whereby said portions may be adjusted toward or away from one another to take up slack therebetween, a member rotatably mounted on said bosses, balls positioned between said member and said bosses and a screw passing loosely through said hollow screw and engaging said threaded recess for drawing said portions together.

3. In an adjusting device for ball bearings, two sections having co-acting bearing parts, a member rotatably mounted thereon, ball bearings between said member and said parts, one of said sections having an opening therein and the other section having a projecting portion extending into said opening, an apertured member adjustably mounted in said opening, said projecting portion being adapted to contact with said apertured member to limit the movement of said sections toward each other and means passing through said apertured member and adjustably connected to the first named section provided with the projection to draw said sections together, said apertured member serving as means for regulating the relative movements of the sections through the medium of the last mentioned means.

4. In an adjusting device for ball bearings of sash pulleys and the like, the combination with a pair of sections including opposed cheeks, one of said cheeks being formed with an internal boss having a tapped hole, the other of said cheeks having an internal boss provided with a reduced portion extending into the hole of said first mentioned boss, a pulley mounted to rotate between said cheeks, bearings between said pulley and said bosses of said cheeks, said boss of the second mentioned cheek having a threaded hole extending partly into the same from the reduced end, a hollow adjusting screw threaded into first mentioned tapped hole and having an exteriorly beveled portion and adjusting screw engaged in said threaded hole in the second mentioned boss and having a beveled head coöperating with said beveled portion to connect said cheeks and draw the same together or permit separation thereof, said hollow adjusting screw serving as means to regulate the relative displacement of the cheeks and adapted to be loosened whereby said reduced portion of the boss second mentioned may be drawn into contact therewith to take up wear between the parts.

5. An adjusting device for ball bearings comprising a pair of co-acting parts, one of said parts having a hole therethrough and the other of said parts being provided with a projecting portion extending into said hole, a hollow member adjustable in said hole and means engaged through said hollow member and adjustably engaged with the projecting portion of the second named part whereby to draw said parts together when said hollow member has been adjusted in the hole of the first part and relative to the projecting portion of the second part.

In testimony whereof I have signed my name to this specification in the presence of two subscribing witnesses.

SAMUEL ROWLAND PARKES.

Witnesses:
O. J. WORTH,
C. P. LIDDON.